Dec. 14, 1965 R. J. HARMSTORF 3,222,876

SYSTEM AND APPARATUS TO PLACE FLEXIBLE PIPES AND CABLES UNDER GROUND BELOW WATER

Filed Aug. 22, 1962 10 Sheets-Sheet 1

INVENTOR.

RUDOLF JOACHIM HARMSTORF

BY

Beaman & Beaman

INVENTOR.
RUDOLF JOACHIM HARMSTORF
BY
Beaman & Beaman

INVENTOR.
RUDOLF JOACHIM HARMSTORF
BY
Beaman & Beaman

INVENTOR.
RUDOLF JOACHIM HARMSTORF
BY
Beaman & Beaman

Dec. 14, 1965 R. J. HARMSTORF 3,222,876

SYSTEM AND APPARATUS TO PLACE FLEXIBLE PIPES AND CABLES UNDER GROUND BELOW WATER

Filed Aug. 22, 1962 10 Sheets-Sheet 5

INVENTOR.
RUDOLF JOACHIM HARMSTORF
BY
Beaman & Beaman

INVENTOR.
RUDOLF JOACHIM HARMSTORF
BY
Beaman & Beaman

INVENTOR.
RUDOLF JOACHIM HARMSTORF
BY
Beaman & Beaman

INVENTOR.
RUDOLF JOACHIM HARMSTORF
BY
Beaman & Beaman

INVENTOR.
RUDOLF JOACHIM HARMSTORF
BY
Beaman & Beaman

Dec. 14, 1965 R. J. HARMSTORF 3,222,876

SYSTEM AND APPARATUS TO PLACE FLEXIBLE PIPES
AND CABLES UNDER GROUND BELOW WATER

Filed Aug. 22, 1962 10 Sheets-Sheet 10

INVENTOR.
RUDOLF JOACHIM HARMSTORF
BY
Beaman & Beaman

United States Patent Office 3,222,876
Patented Dec. 14, 1965

3,222,876

SYSTEM AND APPARATUS TO PLACE FLEXIBLE PIPES AND CABLES UNDER GROUND BELOW WATER

Rudolf Joachim Harmstorf, Schillerstr. 45, Hamburg-Altona, Germany

Filed Aug. 22, 1962, Ser. No. 218,627
7 Claims. (Cl. 61—72.4)

Figure 1:
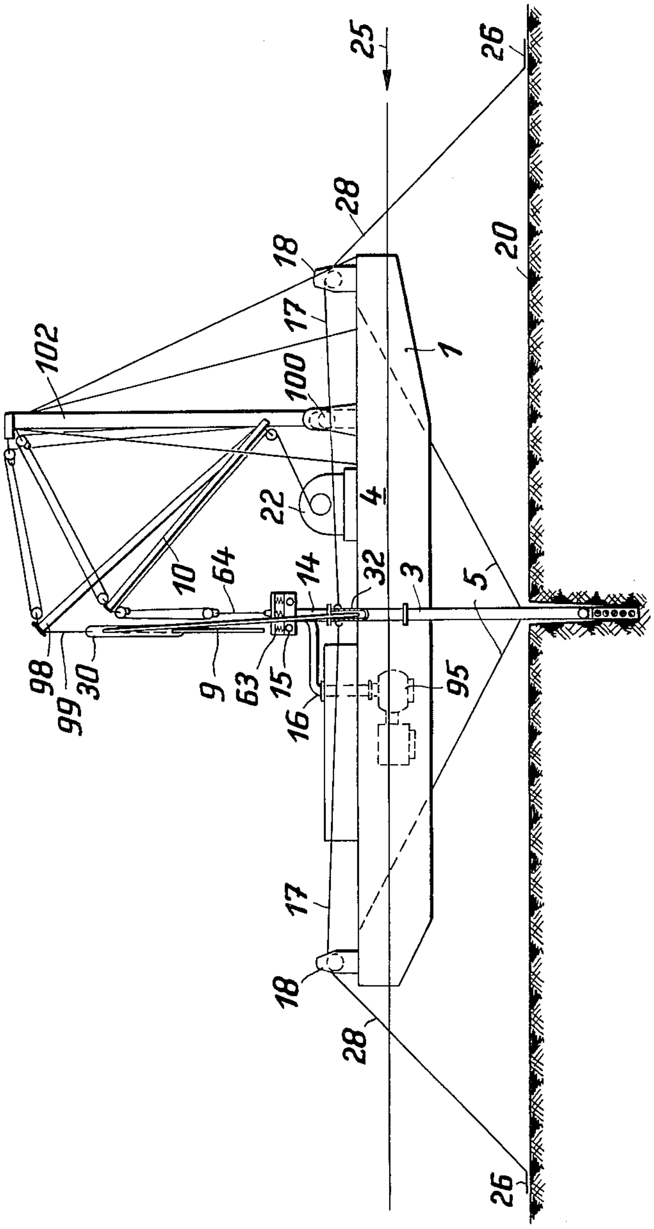

The invention relates to a system and to an apparatus for placing flexible pipes or cables under ground below water, in particular in channels or rivers. It is known to make for this purpose furrows by means of a dredge into which the conduits are placed and which are refilled subsequently. This manner of laying cables and pipes is expensive and in addition time consuming. To this, another drawback must be added, i.e. that the operations required with this type of laying obstruct the traffic on the river or channel for a long time.

One object of the invention is to facilitate the placing of flexible pipes or cables under ground below water.

Another object of the invention is to reduce the amount of ground material to be removed for the purpose of placing flexible pipes or cables under ground below water.

A further object of the invention is to reduce the obstruction of the traffic on the water during the placing of flexible pipes or cables under the ground thereof.

Yet another object of the invention is to reduce the expenditure of men and material for placing flexible pipes or cables under ground below water.

Further objects of the invention will be apparent from the following description in connection with the drawing annexed herewith.

In accordance with the invention, a rigid longitudinally extending box-like carrier having pressurized water and at least one pipe or cable to be laid, introduced on the one longitudinal side and having the pressurized water leaving through nozzles on the other longitudinal side of said carrier with the pipe or cable, leaving also at this latter side. The carrier is moved through the soil of the ground below water in a substantially vertical position wherein a floating member is carrying said carrier and is moved through the water by means of a propulsing member. The carrier is suspended from the floating member by means of a rope engaging at the top end of said carrier, said floating member being retractably anchored in the water and from which two ropes (steering ropes) are guided angularly downwardly over winches to a point of said carrier. In a preferred embodiment of the invention said propulsing member includes a rope which is retractable and anchored at a stationary point near the desired landing point of the pipe or cable to be laid.

In this manner it is possible to rinse small furrows for the pipe or cable to be laid with the aid of the pressure water, which furrow is not much broader than corresponds to the diameter of the pipe or cable to be laid.

It is desired to rinse the said small furrow as deep as is required in the respective cases so as to ensure a protected laying of the cable or pipe to be laid and prevent a floating to the surface of the pipes. The pressure water thus momentarily breaks a small furrow in the ground below the water in which the flexible pipe or cable is laid in one and the same operation. Owing to the small width of the furrow, of a maximum of 10 to 20″, the furrow for the cable will collapse over the pipe or cable conduit introduced already during the further rinsing operation so that the cable or pipe is covered by a protective ground layer of a thickness in correspondence with the depth immediately after the laying operation. This process shows special advantages in that case wherein plastic tubes are to be laid as floating of the tube may be prevented by immediate covering of the empty plastic tube.

It is recommendable to provide in the box-like carrier a plurality of separated channels for the supply of the pressurized water to the individual nozzles or groups of nozzles. In the floating apparatus, from which the cable or pipe to be laid is suspended, a pump assembly is arranged for the generation of the pressure water. The output of said pump assembly is of course dependent on the respective conditions, but as a rule, an output of the pump of about 1350 to 3200 gallons per minute at a pressure of 180 lbs./sq. inch is recommendable. This pressure ensures that the pressure water from the nozzles leaves in a strong jet thereby loosening and transporting the soil in front of the box-like carrier.

To this rinsing apparatus, or box-like carrier, the towing rope is connected immediately above the ground under water which at the target beach (the aimed landing point) runs around an anchored reel and leads back to the tripping winch on the floating member employed in the laying operation. If the furrow to be made should be very long, the towing rope can also be guided around an intermediate stationary point which is anchored in the water itself.

If the towing rope is hauled in by means of the winch of the ship or floating member, then the rinsing apparatus and the ship employed in the laying operation are pulled to the target beach. In so doing, the pressurized water will flow out from the nozzles of the rinsing apparatus which still sticks in the ground and will free a small furrow by rinsing in which the rinsing apparatus will be trailed afterwards. The depth of the furrow is determined by the depth in which the rinsing apparatus is positioned.

The rinsing depth may be read from a scale fitted to the rinsing apparatus or box-like carrier. The respective depth of the water may be currently measured with the aid of an echo sounder or by means of an echo recorder. If one subtracts the water depth from the depth in which the rinsing apparatus is positioned, then one will obtain the depth in which the cable or pipe is laid under ground. The laying installation proper employs an echo-log apparatus. Said echo-log apparatus draws, during the laying operation, a profile to scale, for instance, the transverse profile of the river in which then the measures of the depth are to be entered currently by the special apparatus. On completion of the laying operation one thus has obtained a true transverse profile of the river with the depths in which the cable or pipe is laid.

The rinsing depth necessary to obtain a sufficient safety of the cable or pipe is governed by the geological layers adjacent the ground below the water and the local conditions. The harder the soil, the smaller the rinsing depth may be to guarantee a safe protection of the cable or pipe. The respectively required depth in which the cable or pipe is positioned is generally prescribed by the authorities concerned with water and shipping. Generally, a depth of about 6½ to 10 ft. below ground will suffice. If especially soft grounds are involved, one may rinse the cable or pipe into the ground up to a depth of 13 to 20 ft. However, with the invention, depth as deep as 30 ft. may be obtained.

In this operation, it is recommendable to suspend the hanging rope from which the rinsing apparatus, which is designed in the manner of a channel box, is suspended, by means of a common ships loading equipment. By hauling in and paying out the rope of the pertaining loading winch, the position of the rinsing apparatus may then be changed with respect to its height. Control of the apparatus is then effected with the aid of the two controlling or steering ropes which are guided obliquely upwardly towards the floating equipment, said controlling or steering ropes being likewise led to winches with pulley blocks suitably interposed. The transport or feed of the rinsing apparatus is therefore effected by a pulling force anchored at a stationary point and engaging directly at the apparatus. The rinsing apparatus which is suspended from the loading equipment of the floating member is under these circumstances pushing the floating member in front of it but which is now in turn engaged by the two controlling ropes with the aid of which the apparatus is kept in the desired straight line or is deflected from said straight line. Prinicipally, it would also be possible to lead these two controlling ropes not to winches which are arranged on a floating member but likewise to two stationary points which are situated on both sides of that stationary or target point to which the towing or propulsing rope is pivoted or around which it is deviated. However, this is unsuitable inasmuch as in this manner the components of the force which are available to steer the rinsing apparatus would only be relatively small.

Suitably, a keep-down cable is engaging at the head of the rinsing apparatus which, preferably via a pulley block, leads to a winch disposed on the floating member so that the weight of the floating member may be transferred in part to the rinsing apparatus. This may under certain circumstances prove to be suitable when very hard soil is to be handled. Generally, however, the own weight of the rinsing apparatus will suffice to keep it in the respectively desired depth which is controlled by the suspending rope.

It is also possible with the aid of the invention to rinse a plurality of cables and pipes into the ground simultaneously. If several pipes or cables are to be rinsed in simultaneously, they will be arranged one behind the other looking in the direction of the rinsing apparatus so that the width of the rinsing apparatus is not increased thereby. The individual cables or pipes are fed to the rinsing apparatus from above, i.e. with the aid of a loading equipment which may be designed similarly to that loading equipment from which the rinsing apparatus is suspended. The loading equipment for introducing the cables or pipes into the upper end of the rinsing apparatus is provided with roller bearing drop hangers over which the individual cables or pipes are fed to the rinsing apparatus.

Instead of the loading equipment for the suspension of the rinsing apparatus and the feeding of the cables or pipes, correspondingly designed cranes, in particular board cranes, may be employed as well.

The term "flexible pipes" especially involves plastic tubes, lead tubes and aluminum tubes. Plastic tubes of this type are in this connection generally serving as water and waste water conduits, for carrying chemicals or other liquid media, or as gas pipes laid under water or pipelines for the reception of liquid fuel. Finally, such plastic tubes also serve as cable protection pipes which have cables of all types drawn into them later on. In such a case, it is recommendable to place simultaneously a relatively thin wire into the plastic tube which then after the tube has been laid serves the purpose of pulling through successively stronger wires and finally the cable. Lead tubes are especially serving the purpose of receiving gas, while aluminum tubes are used to convey gases and liquid media.

With the aid of the invention it is no doubt possible to lay the plastic tubes which have so far been produced by the plastics industry up to an outside diameter of about 14". It is furthermore possible to install up to seven plastic pipes and even more in one simultaneous laying operation.

It may furthermore be recommendable to place an oscillation generator or vibrator on the head of the apparatus. The oscillations which are imparted to the whole of the apparatus and in particular to the walls thereof by the oscillation generator considerably reduce the shell friction of the apparatus moving through the soil and, in addition, effect a movement in the grains of the soil in front of the rinsing apparatus. The use of such an oscillation generator is of special advantage in connection with gritty and pebbly soils.

It is in addition recommendable to place at least one suction pipe in the rinsing apparatus in front and beside the pressure water channels and the slide channel provided for the passage of the cables or pipes. Said suction pipe terminates preferably at the bottom of the rinsing apparatus. The suction force is generated by a jet effect in that especially at the lower end of the suction pipe some upwardly directed nozzles are inserted through which pressurized water is discharged. Instead of the pressurized water, also compressed air may be employed in particular for these suction channels.

Prior to each rinsing operation, the line is suitably examined to find obstructions that might be present in the sand such as parts of wrecks, anchor chains, trunks of trees etc. by a trial rinsing. These obstructions may then be removed with the aid of suction dredges, a gripper equipment or lifting mechanisms which may be provided on the ship employed in the laying operation. The trail rinsing is in addition intended to show whether the required depth may be reached without an additional preparation of the ground with the rinsing apparatus and, if desired or required, with the vibrator. If heavy soils are to be handled which are not capable of being rinsed or vibrated, such as dry marl or clay, a special quick-drilling apparatus is employed which is placed in front of the rinsing apparatus to loosen the soil. If a rock is encountered a drill hole is made by this apparatus every 20 to 30" with the aid of special core bits, which holes are then charged with explosives. In this manner, the whole line is then blasted.

Another method to blast rocks consists in the following: During the trial rinsing, a plastic tube is rinsed into the ground of the rock into which after completion of the trial rinsing a bandaged charge of explosives provided with corresponding ignition means is drawn in with the aid of a pulling rope placed in the plastic tube before. With corresponding measures of precaution being taken and after clearing the line, this explosive line lying on the rock is ignited. As the explosive charge has an extremely good damming because of the gravel or soil layer over the rock, the striking force of the explosive material is directed downwardly into the rock and thus tears a deep ditch in the direction of the line. Through this pre-blast line the rinsing apparatus is then drawn like a plough with strong pulling forces and with the employment of additional rinsing and vibrating aids.

Plastic tubes are made in endless lengths. The length is only a question of transport while the laying of such endless tubes does not cause any difficulty. The suppliers are producing lengths of up to about 1000 ft. in rings for railway transport. Lengths of about 1000 ft. to about 7000 ft. are wound on lightweight pipe drums which are also suited for railway transport.

With plastic tubes having lengths of more than about 7000 ft., there is the possibility of placing an auxiliary ship or a sea-going barge directly by the side of the plastic tube manufacturing plant and have the finished tubing directly run onto big special drums. The diameters of the drums of rings are governed by the diameters of the plastic tubes.

It is also possible to erect a portable extruder installation on site and carry out the production of the plastic tubes where needed. In this case, no drums are required but the tubes are directly pulled into the water as produced and are stored there while afloat until they are needed in the laying operation. This manner of production is especially advantageous in connection with tubes of large diameters which are difficult to wind on drums owing to their large bending radii.

Through these rinsed-in plastic tubes proper sizing devices (calibers) are pulled after they have been laid with the aid of a pulling wire placed into the plastic tube before or during the manufacture thereof. Thus, all the plastic tubes are checked as to their inner cross section. The sizing devices are mostly about ⅛ to 3/16″ less in diameter than is the inner diameter of the plastic tube. If cables are to be drawn into the plastic tubes, a fatty or fattened bag is pulled through after the caliber test with the aid of the pulling wire wherein the fatty bag lubricates the inner wall of the tube. Thereafter a stronger pulling rope is pulled through with which heavier cables may be drawn into the plastic tubes without difficulty. The cable drums are for this purpose placed at one tube end at the beach in such a manner that the cables may be easily removed from the drum and fed into the plastic tubes. On the opposite beach a winch or pulling machine is placed at the end of the plastic tube which assures a uniform introduction of the cable. The pulling force may be recorded and read off during the whole time of the drawing operation from built-in dynamometers. In case of long pulling lengths, the cable may be run through a fatty bath once more prior to entering the plastic tube to give it a special lubrication. It is furthermore possible to fill the plastic tube with oil or water in order to decrease the cable weight by the buoyancy volume thereof. Thereby the pulling force which is dependent on the cable weight is decreased.

In case the plastic tubes are intended to serve as water pipes, a pressure test is conducted on completion of the laying operation. In difficult laying operations, the plastic tube may be kept under pressure during the whole laying operation. If the plastic tube is damaged, this may be noticed during the laying operation by the suddenly occurring pressure drop and the tube may be repaired on site by cutting and newly connecting the tube by couplings.

It has been noticed that it is necessary in order to obtain the necessary amount of stability, to use either a large ship or to connect several pontoons or smaller vessels rigidly with each other because when using only one small ship and in case of strong wave motion or if a solid soil is to be handled, there is not sufficient stability. If two smaller ships or pontoons are rigidly connected with each other, the necessary stability is guaranteed. A special advantage of the invention occurs in that the rinsing apparatus may be kept absolutely to the required depth and direction but that the movements of the ship from which the rinsing apparatus is suspended are not transferred onto the rinsing apparatus. Another advantage resides in the fact that it is not only possible to adjust the vertical position of the rinsing apparatus with respect to the ship at any time but it is also possible to guide and merge the rinsing apparatus, that means to change its direction of forward movement. Still another advantage of the invention consists in that the ship may be quickly detached from the rinsing apparatus, in which it must be considered that the rinsing apparatus is standing in the soil during the operation in which a cable or pipe is rinsed into the ground and must therefore be completely lifted from the ground at the moment of danger in order to be detached from the ship. If a storm or other danger is suddenly occurring, it is possible with the invention to interrupt the connection between the ship and the rinsing apparatus quickly by which the occurrence of severe damages is avoided.

Figure 2:
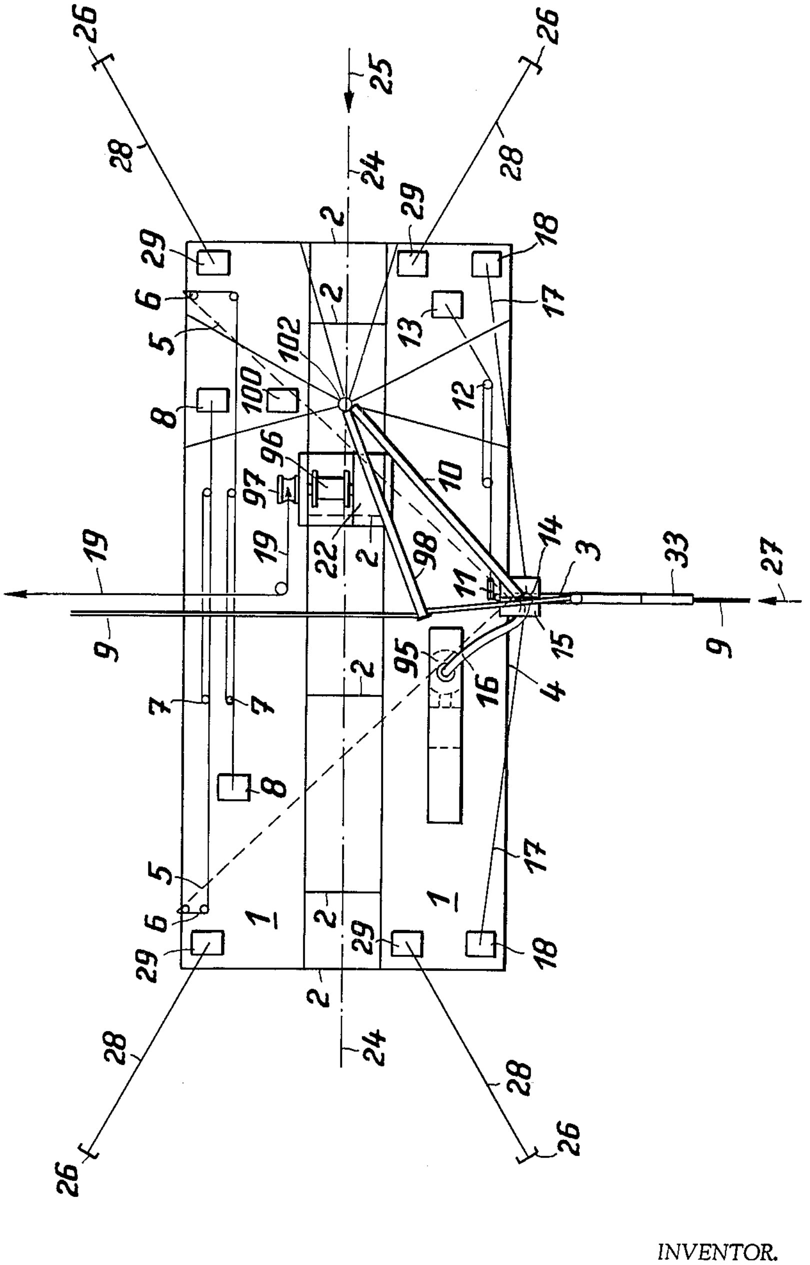
Figure 3:
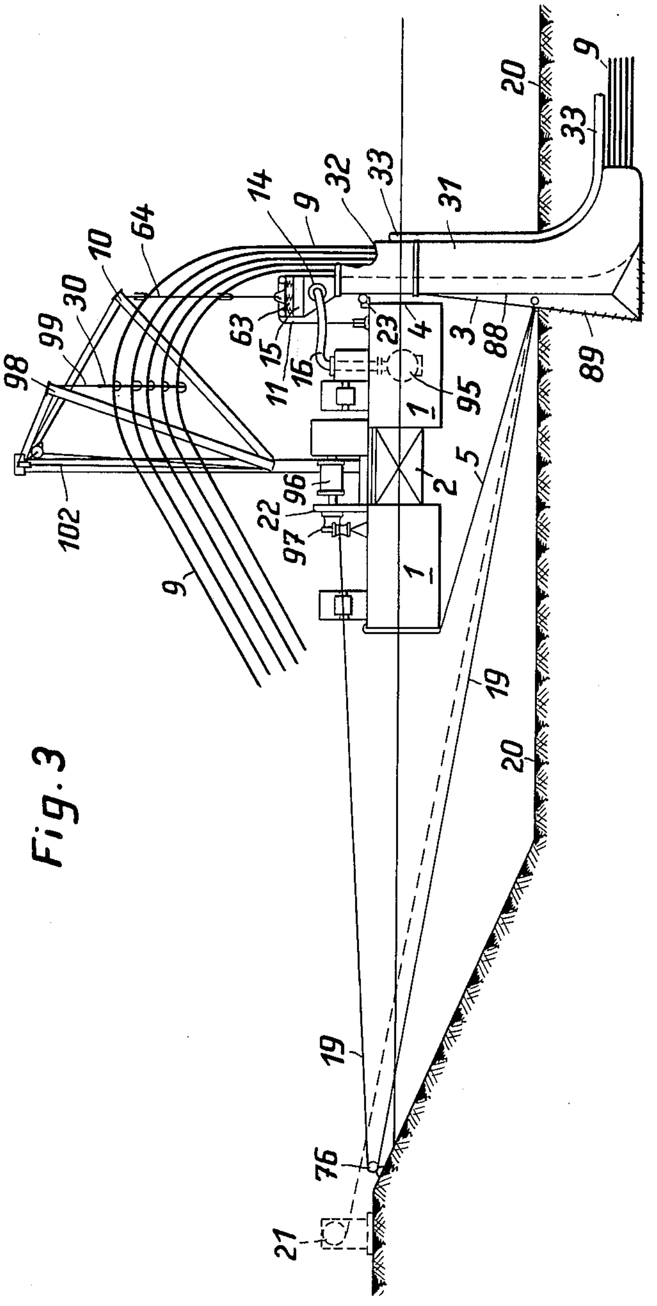
Figure 4:
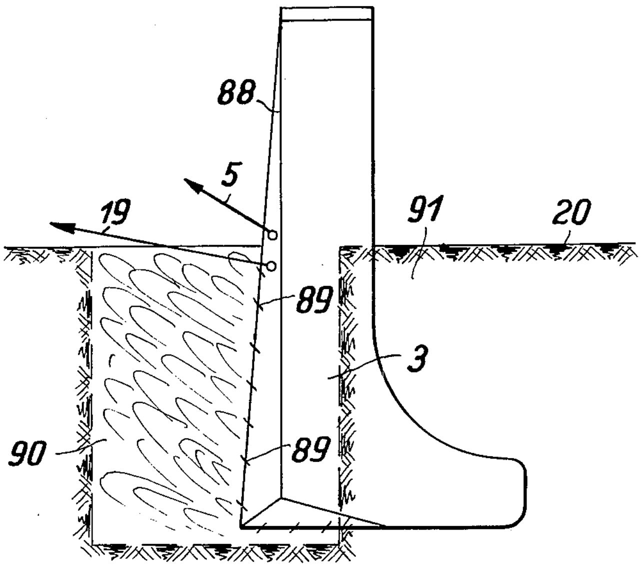
Figure 5:
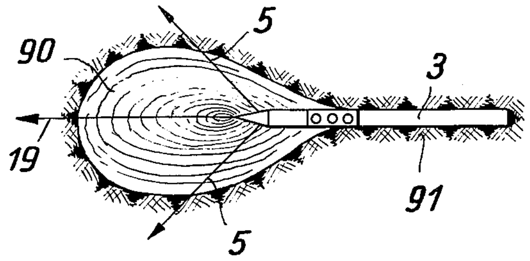
Figure 6:
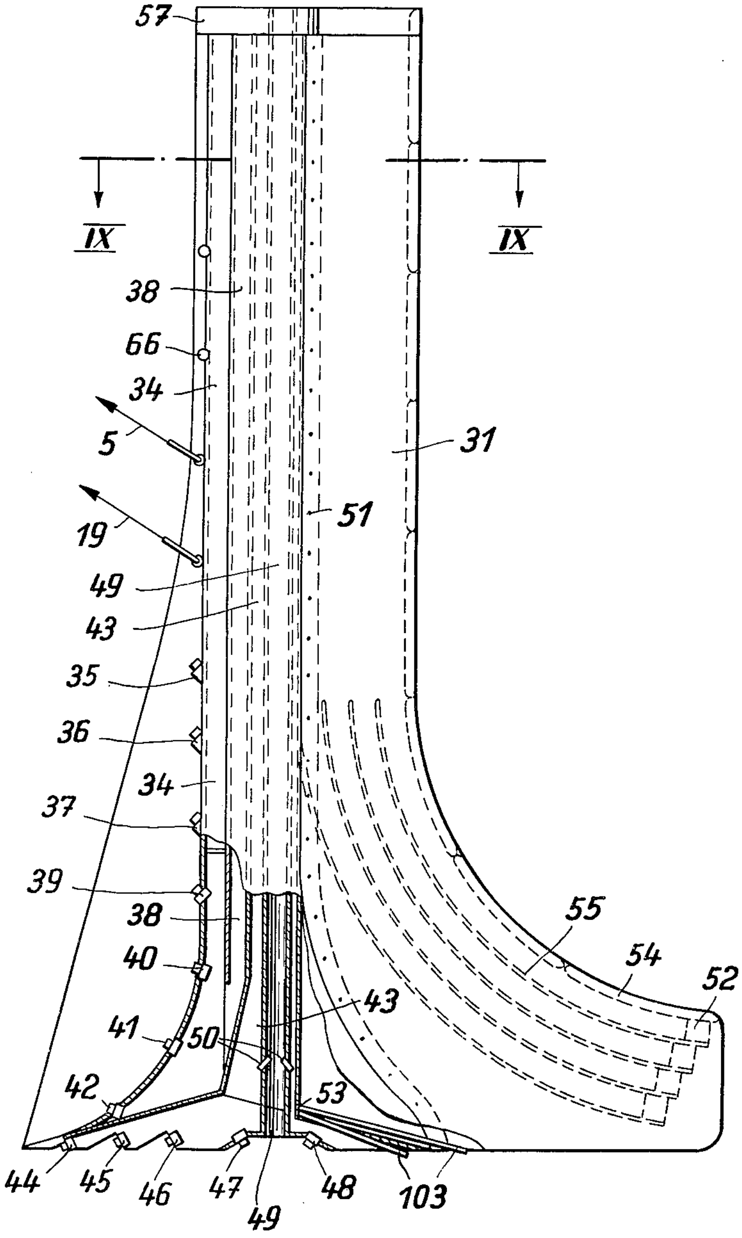
Figure 7:
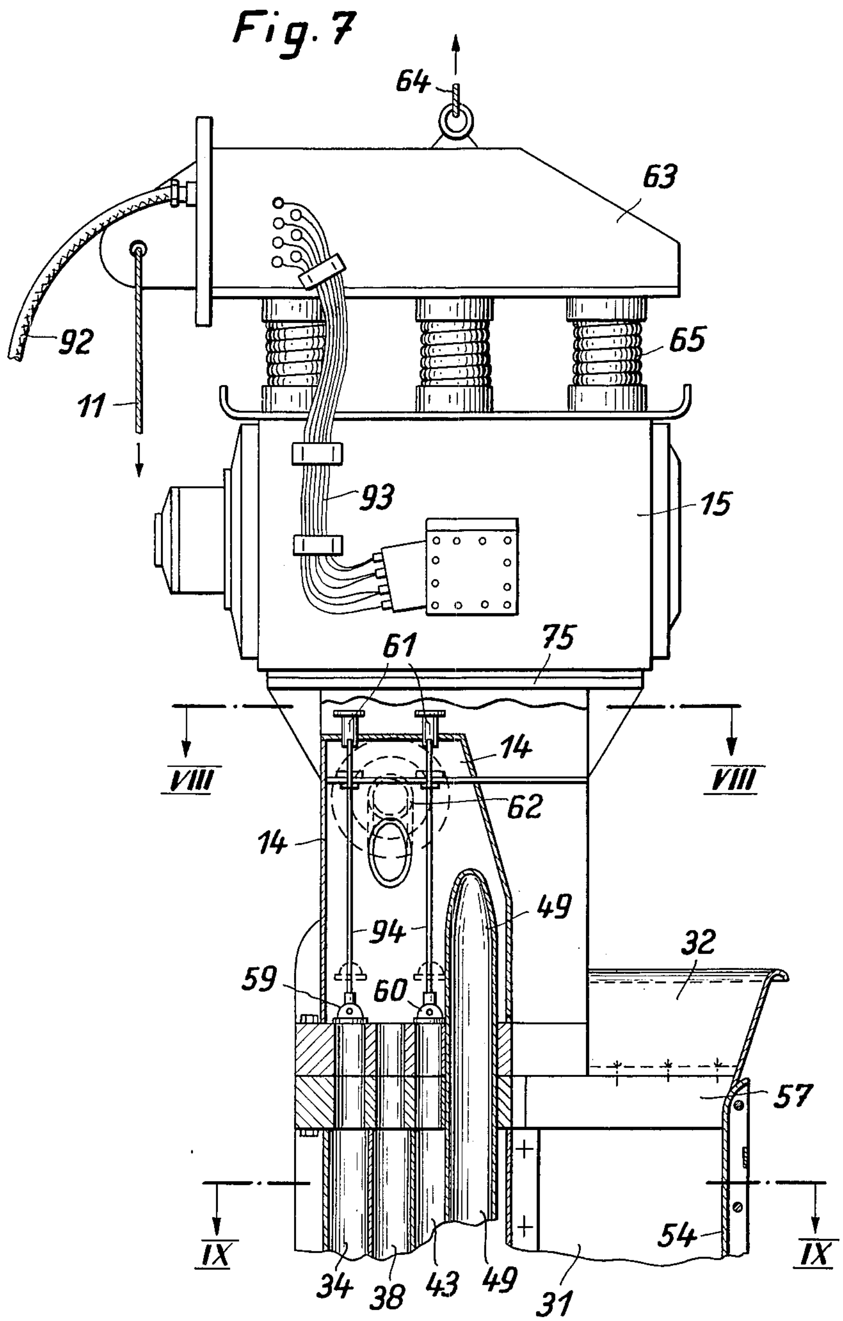
Figure 10:
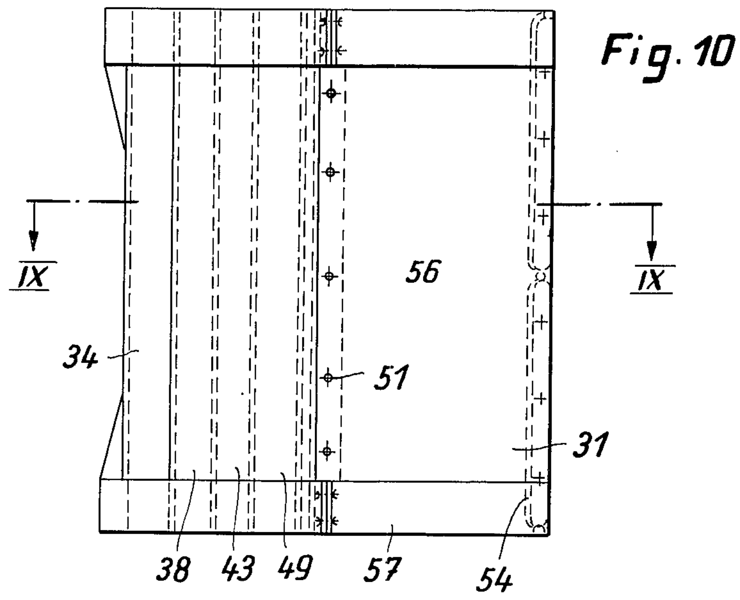
Figure 9:
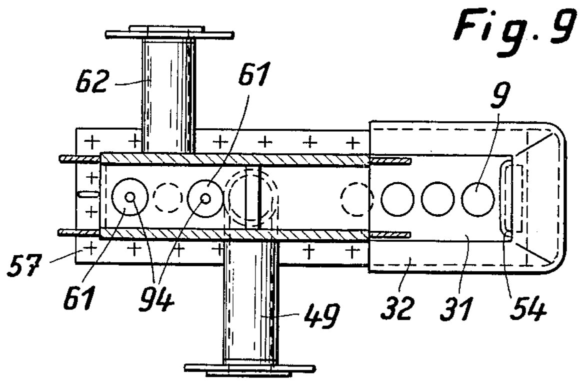
Figure 8:
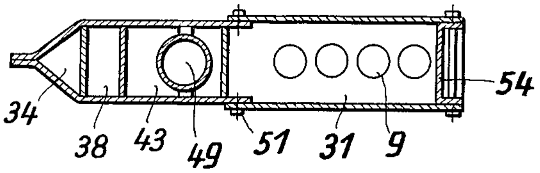

The invention is explained in more detail with the aid of the attached drawings in which some embodiments of the invention are shown in a simplified manner. In the drawings:

FIG. 1 shows a side view, transversely of the direction of flow of a river, taken on an arrangement in accordance with the invention for laying a plurality of plastic pipes, FIG. 2 shows a plan view on the arrangement of FIG. 1, FIG. 3 shows a longitudinal view looking in the direction of the river, and taken on the arrangement shown in FIGS. 1 and 2, FIG. 4 is a schematic side view on a rinsing apparatus in accordance with the invention in operation (showing a sectional view of the furrow which has been rinsed out), FIG. 5 a top view taken on the apparatus shown in FIG. 4, FIG. 6 a view of a box of the rinsing apparatus in accordance with the invention on an enlarged scale and in the position as shown in FIGS. 3 and 4 but without the valve head arranged on top and the vibrator situated thereabove, FIG. 7 a partially sectional view similar to that shown in FIG. 6 taken on the top portion of the rinsing apparatus including the valve head and the vibrator on a still more enlarged scale, FIG. 8 shows a sectional view of the valve head of the rinsing apparatus arranged on top and taken on line VIII—VIII of FIG. 7, FIG. 9 shows a sectional view of the rinsing box or an extension piece taken on line IX—IX of FIGS. 6, 7 and 10.

Figure 11:
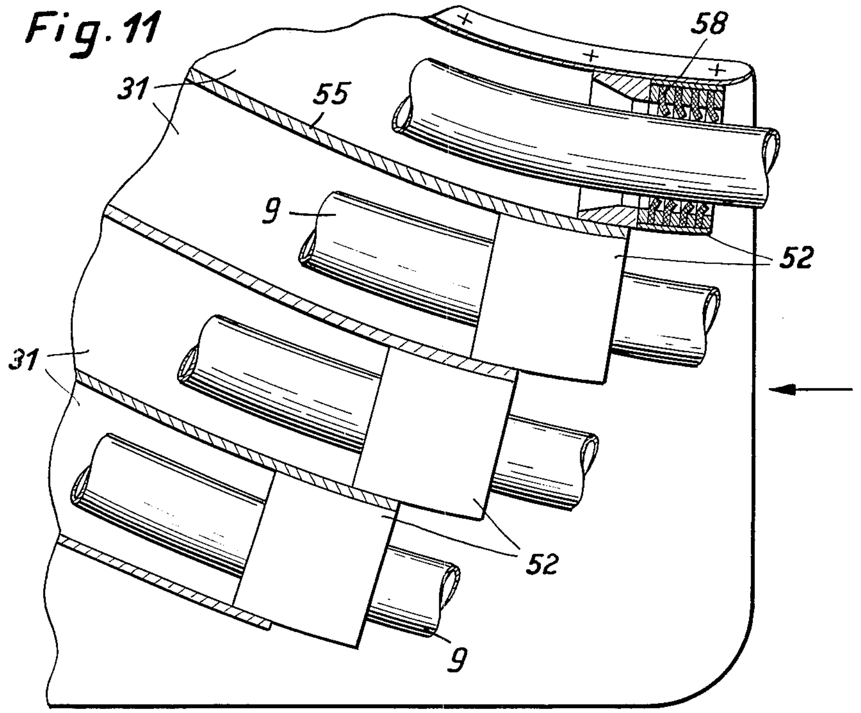
Figure 12:
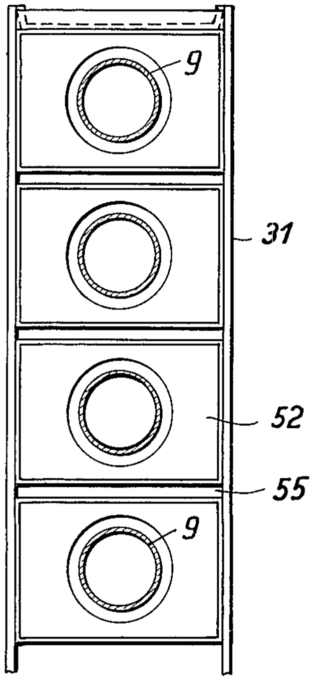
Figure 13:
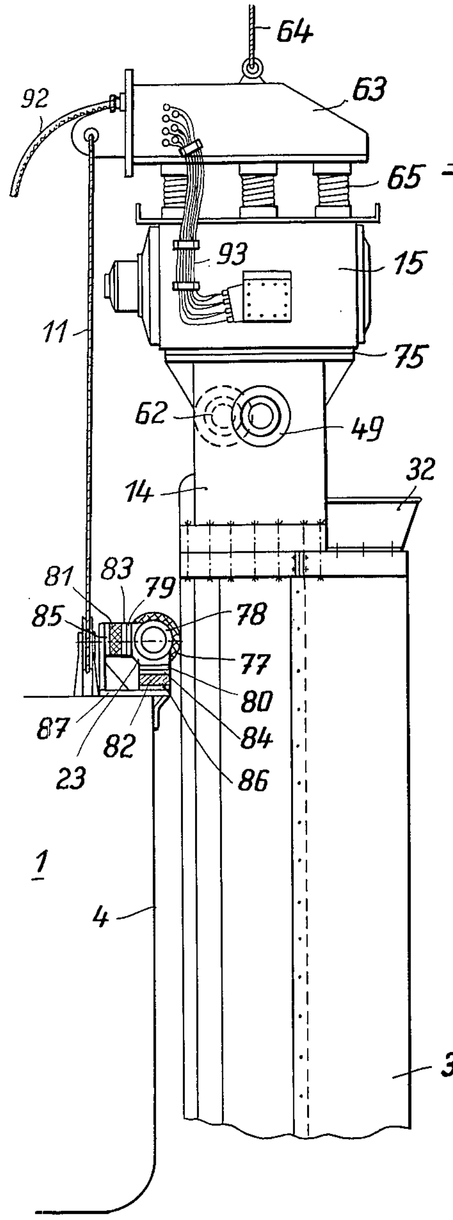
Figure 14:
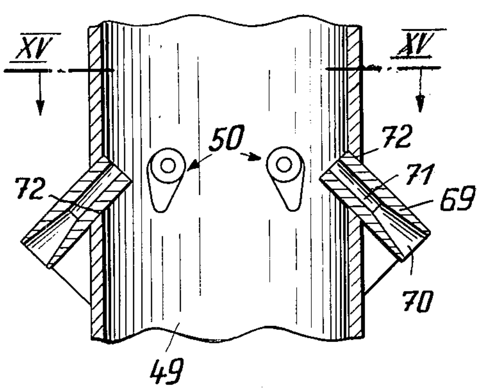
Figure 15:
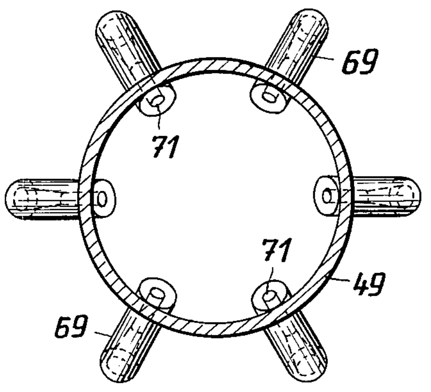
Figure 16:
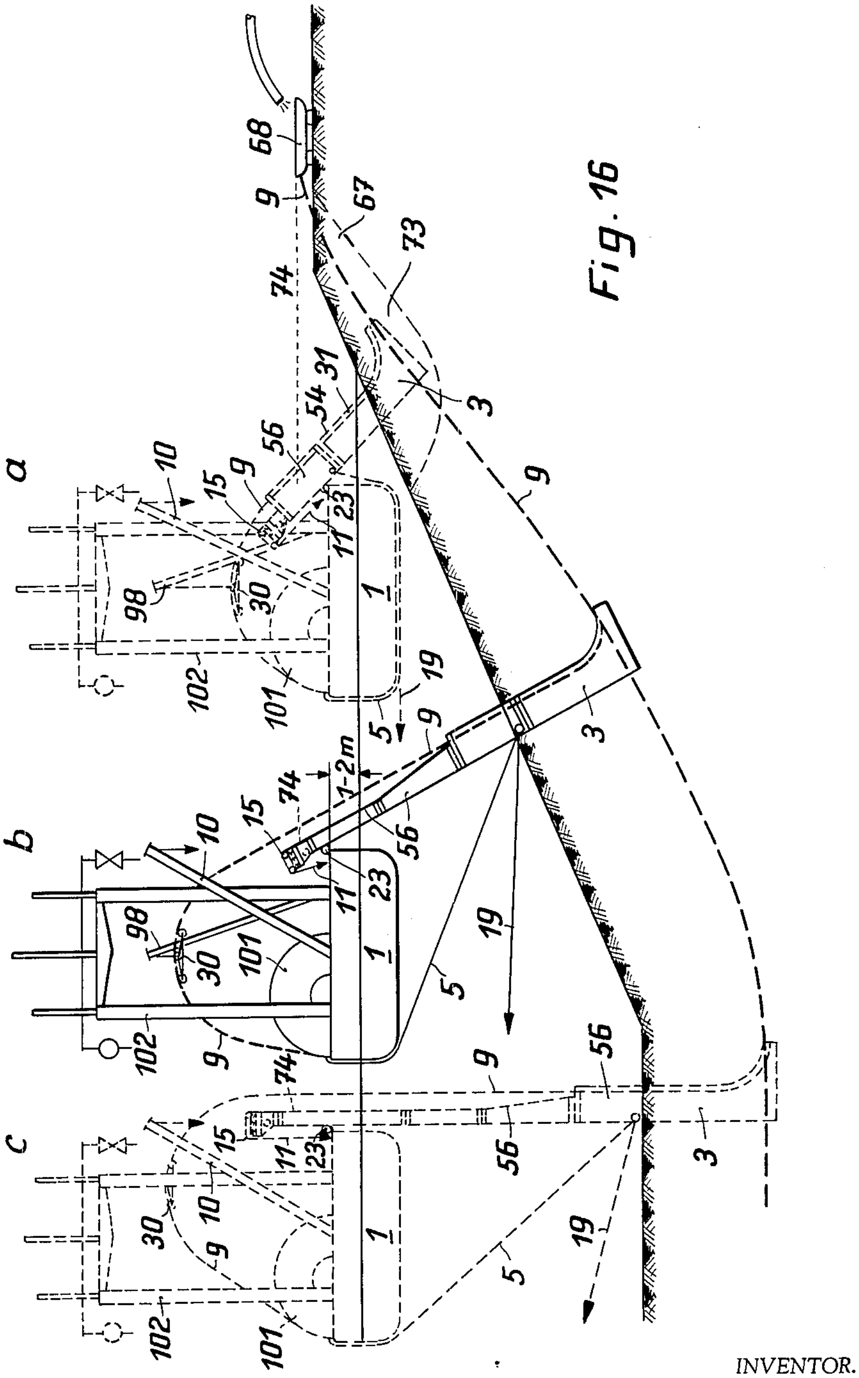

FIG. 10 shows a view similar to those of FIGS. 6 and 7 taken on an intermediate member used for the rinsing apparatus of the invention, FIG. 11 a partial longitudinal sectional view through the exit end of the rinsing apparatus box with a stuffing box shown in section through which a plastic pipe laid with the aid of the rinsing apparatus according to the invention, issues from said rinsing apparatus, FIG. 12 shows a view on the exit end of the rinsing apparatus taken in the direction of the arrow of FIG. 11, FIG. 13 is a partial view of FIG. 3 but on an enlarged scale, FIG. 14 is a partial sectional view taken on the suction pipe provided in the rinsng apparatus with this sectional view being taken in the direction of the axis of the tube, FIG. 15 is a cross sectional view taken on line XIV—XIV of FIG. 14, FIG. 16 is a simplified view similar to that of FIG. 3 taken on an arrangement in accordance with the invention for laying a plastic pipe, said arrangement being shown in several successive positions on the beach of a river or channel, i.e. (position a) directly at the embankment, (position b) between the embankment and the fully extended working position of the rinsing apparatus provided in accordance with the invention, (position c) with the rinsing apparatus fully extended and suspended in an almost vertical position.

The arrangement of the rinsing apparatus on two rigidly interconnected ships—easily detachable with the aid of several ropes and capable of control during operation concerning level and direction—is at first described by way of the FIGS. 1–5. In this representation it is assumed that the pipes or cables 9 to be laid are coming from drums which are supported in a manner not shown outside the two ships employed in the laying operation.

As will be seen from FIGS. 1–3, for carrying out the process in accordance with the invention, two ships 1 are rigidly interconnected by means of a lashing 2 to constitute a floating unit. The lashing connection of the two ships 1 may however be effected as well by special carriers or in some other suitable manner. Arrangement of the rinsing apparatus 3 may be effected between the two ships as well as laterally or in front of the ships. In the present example, the rinsing apparatus 3 is arranged on one longitudinal outside 4 of the one ship 1. The rinsing apparatus 3 is connected with the two ships 1 by means of two steering-ropes 5 extending angularly outside. These two steering-ropes 5 are in engagement with the bottom end of the rinsing apparatus 3 and are running over a roller guide 6 and pulley blocks 7 to winches 8 (please see FIG. 2), which are arranged on the ship 1. By shortening or hauling in the one steering-rope 5 and slackening or paying out the other steering-rope 5, the rinsing apparatus may be steered to the right or left as required. For explanation please compare FIGS. 4 and 5. A plurality of nozzles 89 are arranged on the front edge 88 of the rinsing apparatus 3 in a manner to be described hereinafter through which pressurized water may be ejected. In this way, the surroundings 90 in front of the rinsing apparatus 3 are rinsed free, while the surroundings 91 behind said rinsing apparatus (looking in the direction of pulling) are again retained by the soil accumulating at the rinsing apparatus. If the one steering-rope 5 is hauled in and the other steering-rope 5 is paid out, a transverse force is exerted on the rinsing apparatus 3 freely movable in front of the sand and water mixture and clamped with the rear portion in the soil, and thereby a steering effect to the right and to the left is made possible.

If the river or channel in which the plastic tubes are to be laid is becoming shallower, then both steering-ropes 5 will be hauled in to a greater degree and, in case the depth increases, they are slackened or paid out. This is possible during operation without any disturbance owing to the arrangement of the winches 8.

The rinsing apparatus 3 is kept in the desired depth by means of the loading equipment or the crane 10. Another tension member or rope 11 serves in this operation to pull down in a vertically directed tensional force and, if desired, makes possible the application of part of the ship's weight on the rinsing apparatus 3 when heavy soils are to be handled which may be effected via a pulley block 12 and a winch 13.

An oscillation device or vibrator 15 is arranged on a head member 14 of the rinsing apparatus 3 (please see also FIGS. 6–12) which causes vibrations in the rinsing apparatus 3. The vibrations are generated by rotating unbalance weights with a direction of impact that extends vertically of the rinsing apparatus 3. Thus the vibrations in the rinsing apparatus are extending in parallel with the longitudinal axis. The vibrator releases the rinsing apparatus from the surrounding earth to which it sticks by the oscillations with the earth remaining in continuous flowing movement. By this, the frictional energy which must be created by the rinsing apparatus is greatly decreased and makes it possible that the apparatus may deeper penetrate into the earth even with most heavy soils.

The vibrator 15 (please see also FIGS. 1–3 and 7, 13) is carrying out the oscillations and is rigidly screwed to the head 14 of the rinsing apparatus 3 by its bottom plate 75. The frequency of the vibrations is between 1200 and 300 per minute in dependence upon the geological formation of the soil which is to be expected. The oscillation amplitude at the rinsing apparatus which is obtained by the vibrator is dependent on the weight of the rinsing apparatus. A spring yoke 63 is connected to the vibrator 15 with the interposition of, for instance, eight strong springs 65. The springs may be equally stressed as to tension as well as compression. On the spring yoke 63 isolated against vibrations in this manner, the rope 64 of the loading equipment 10 and the pull-down rope 11 are engaging.

The electric connection for the vibrator is guided together with the main cable 92 from the switch cabinet (not shown) to the vibrating spring yoke 63 and is guided from there to the vibrator 15 with the aid of flexible rubber hose lines 93 which are not sensitive to oscillations and with a sufficiently large balancing loop.

The completely enclosed vibrator which is constructed in accordance with the requirements of the site, is driven by two special electric motors. These two elecrtic motors are mechanically coupled so that invariable synchronous running is guaranteed. The press buttons for operation, the indicating instruments for the control and supervision and the automatic starting switch are arranged in a cabinet aboard the ship. The vibrator may be designed in a manner other than described. The vibrations may be generated electromagnetically or by means of ultrasonics instead of the unbalancing masses.

The pressurized water enters the rinsing apparatus 3 at the head member 14 of the rinsing apparatus 3 through high pressure hoses 16. For a better guiding of the rinsing apparatus 3, two head cables 17 are in addition arranged at the head member 14 which are moved on winches 18. The pumps 95 for the generation of the pressurized water are arranged inside the ships 1 or in one of them.

During operation the whole arrangement is pulled by means of a towing or propulsion rope which is engaging at the lower portion of the rinsing apparatus 3 just above the ground 20 under the water. The towing rope 19 may be actuated by means of a winch 21 which is disposed at the target beach or by means of a ship winch 22 wherein the rope 19 is returning to the lower portion of the rinsing apparatus 3 via a reversing roller 76 mounted on land.

On the board edge 4 of the ship 1, a roll device 23 is provided in a resilient bearing such that the vibrations of the rinsing apparatus 3 cannot be transferred onto the ship 1.

The roll device 23 (please compare FIG. 13) consists of a vulcanized roll 77 made of natural or synthetic caoutchouc which is pivotally supported in a rack 78 but is provided with two flanges 79, 80 which are arranged at angles with respect to each other, preferably at right angles. To these flanges 79, 80, flanges 83, 84 are fastened which are rigidly connected with rubber members 81, 82 which are in turn rigidly connected with another pair of flanges 85, 86. The parts 81–83–85 and 82–84–86 form oscillating metal members through which the rack 78 of the roll 77 is fastened to another rack 87 which is arranged at the wall 4 of the ship's board.

From the arrangement as shown it is clearly visible that it is possible to subject the towing rope 19 also to a heavy pull, for instance, via pulley blocks which are arranged on land without the ships being capable of giving way, and without the respective vertical position of the rinsing apparatus 3 being changed. The rinsing apparatus 3 may be arranged such that the rinsing-in is effected transversely of the longitudinal axis 24 of the ship or such that the rinsing-in is effected in the longitudinal direction. The manner how the arrangement is effected is dependent on the anchoring conditions in the river 25 because one cannot place the ships transversely in the stream. In the example shown, the plastic tubes 9 must be laid in a transverse direction to the stream 25 for which reason the rinsing apparatus 3 is fitted vertically at the wall of the board 4 of the ship 1 while the ship itself is lying in the direction of the stream 25. The ships 1 themselves are kept in the line 27 on four anchors, always two downstream and two upstream, so that it is possible to steer the ships 1 always upstream and downstream of the line 27 during the laying operation by the anchor ropes 28 which are running on wiches 29.

By the process and system of the invention it is also possible to run bows, complete circles or other desired curvatures in the river ground 30 with the aid of the rinsing apparatus 3. This is especially important when during a rinsing-in operation carried out with plastic tubes or cables obstructions are in the way which must be avoided such as for instance a wreck or the like.

When first employed at the starting beach (please compare FIG. 16), the rinsing apparatus is disposed almost horizontally. It is thus lying with the upper portion onto the vulcanized roll 23 and has its lower portion standing in the open slot 67 at the beach (please compare position a of FIG. 16). In case of necessity, the embankment may be opened before and the rinsing apparatus 3 placed in the opened starting pitch 73 of the beach by its foot.

In this position, the closure flaps 54 are then opened at the rinsing apparatus 3 and the plastic tubes or cables placed into the upwardly situated and almost horizontally disposed conduit channel 31 and the closure flaps 54 closed thereon. The cable or pipe 9 is in this example pulled from a drum 101 which is supported on the ship 1. The pulling-off of the pipe or cable 9 results from the onward movement of the ship 1 and the rinsing apparatus 3 by means of the rope 19. In case of need, an intermediate member 56 is already fitted on the rinsing apparatus 3 in which the plastic tubes and cables or conduits are placed in the same manner as just described. Thereupon, the head member 14 with the connections for the pressurized water as well as the vibrator are fitted. The steering ropes 5 as well as the towing rope 19 have already been guided along underneath the ship and fastened at the rinsing apparatus 3.

When laying plastic tubes, the front ends of the plastic tube 9 are pulled on land after having been placed in the conduit channel so far that they may be connected to an overflow basin 68 which is mounted on the beach.

After completion of the preparing work as described, the overflow basin 68 is filled with water; thus the plastic tubes in the rinsing apparatus are also filling with water up to the level of the overflow basin (dotted line 74). This condition is maintained during the entire laying operation and it is thus guaranteed that that portion of the plastic tubes which is still situated in the pipe drum, is not filled with water.

On completion of the preparing work as described, pressurized water is led onto the rinsing apparatus, and the towing rope 19 thus pulls the rinsing apparatus in a direction towards the target beach (position *b* of FIG. 16). With the laying depth increasing, the rinsing apparatus 3 is gradually changed from the almost horizontal direction into the vertical direction (position *c* of FIG. 16) by means of the steering ropes 5. Also with increasing depth of water, further intermediate pieces 56 are fitted into the rinsing apparatus 3.

It is possible in accordance with the invention to rinse-in one to seven or even eight plastic tubes simultaneously. The plastic tubes or cables 9 are introduced into the rinsing apparatus 3 from above via roller bends 30, and are running one behind the other in the slide channel 31 provided therefor to leave in superimposed arrangement and enter the river ground 20 after having been turned by 90° in the foot portion of the rinsing apparatus 3.

On the entrance of the plastic tubes 9 into the slide channel 31 a funnel-like inlet member 32 may be arranged (please see FIGS. 3, 7 and 13) which is continuously filled with solid fat. On passing through this inlet member 32, the plastic tubes 9 are thus receiving a thin film of fat so as to pass through the slide channel with as little friction as possible. This appears to be especially important at the bending radius of the slide channel 31 at the foot end of the rinsing apparatus 3, because in this place the plastic tubes 9 are displacing owing to hte different bending radii of the inner and outer tubes and the differently long ways resulting therefrom. On the rear side of the rinsing apparatus 3, a pressing tube 33 (please FIG. 3) may be arranged by which a liquid press-concrete of gravel may be poured or pressed onto the plastic tubes. This latter process may be employed if very light soils of a peat-like character are to be handled, so as to make possible an anchoring of the relatively lightweight plastic tubes which are having a considerable tendency to buoy or to float.

The pressurized water channel of the rinsing apparatus 3 (please see FIGS. 6–10) is subdivided into three channels, the divisional channel 34 of which feeding the nozzles 35, 36, 37, the divisional channel 38 of which feeding the nozzles 39, 40, 41, 42, and the divisional channel 43 of which feeding the nozzles 44, 45, 46, 47, 48. Within the pressure water channel 43, a suction pipe 49 is inserted which at its lower end carries suction nozzles 50. On the rear side of the apparatus, the conduit or slide channel 31 is arranged. Said conduit channel 31 may be exchanged in accordance with the number and diameters of the pipes or cables to be laid. It is fastened to the rinsing apparatus by means of bolts 51. At the discharge end of the conduit or slide channel 31, stuffing boxes 52 are provided with sleeves 58. In order to facilitate the exit of the plastic tube or cable 9 from the sleeves 58, two nozzles 53 of the partial channel 43 are directed rearwardly and are terminating adjacent the exit point of the pipes or cables 9 to be laid with the interposition of the pipe 103. The water jets leaving these nozzles 53 are above all loosening the soil in the neighborhood of the point where the cables or tubes 9 are leaving the sealing sleeves. The conduit or slide channel 31 can be opened completely rearwardly by means of closure caps 54 so as to be able to fit the plastic tubes or cables 9 in the conduit channel 31 or detach them therefrom. In case of necessity, the conduit channel 31 may be subdivided into several individual channels by means of lands 55 so as to abolish or remove the pressure of the plastic tubes one onto the other within the curvature radius of the conduit channel 31. The suction nozzles 50 of the downwardly open suction tube 49 are facing upwardly and are preferably equally spaced on the periphery of the suction pipe 49. The pressurized water is fed to the nozzles via the partial channel 43. The water jets leaving the nozzles are creating a vacuum inside the lower portion of the suction pipe 49 and thus a suctioning effect which, through the channel 49, carries a mixture of water and sand upwardly and transports it behind the rinsing apparatus looking in the direction of pulling via a drain in the head of the rinsing apparatus. Thus, the soil below the apparatus is sucked away and is delivered onto the already laid pipe. Instead of the pressurized water, compressed air may be supplied to the nozzles 53 as well.

In order to elongate the rinsing apparatus in the vertical direction, box-like intermediate members 56 are employed which are containing the same channels 34–38–43 for the pressurized water and the suction channel 49 and the same conduit channel 31 with the closure flaps 54. The connection between the individual intermediate members and the main box carrier is made by means of strong flanges 57 with corresponding bolts. The head member 14 is fastened by means of flanges either to the rinsing box carrier or the intermediate members 56. It carries (please see FIG. 7) the valve flaps 59, 60 which are actuated through valve spindles 94. The valve spindles are protected by a removable box and are operated by means of a socket-wrench. This latter offers the advantage that there is nothing protruding from the head member that might get damaged somehow.

The pressurized water is conducted through the connection pipe 62 which may be a pivotable pipe bend.

The head member or valve head 14 has arranged thereon on a strong steel plate (please see FIGS. 7 and 13) the vibration generator 15 which subjects the whole construction to vertical oscillations. Above the vibration generator 15, a spring suspension 63 is arranged on which the rope 64 of the loading equipment and the pull-down rope 11 are engaging. The spring suspension is provided for the purpose to avoid oscillations being transferred into the loading equipment 10 via the rope 64 and into the ship's hull via the rope 11. At the valve head 14, the valves to the upper nozzles 35, 36, 37 and the lower nozzles 44, 45, 46, 47 may be easily actuated during operation. Thereby, when operating the lower and upper nozzles, at one time more water may be delivered and less at another time, or the upper and lower nozzles may be closed, respectively, just as is required in working the earth layer at the respective site.

Bearing bushes 66 are fitted at the cutting edge of the apparatus into which the shackles for fastening the propulsing or towing wire or rope 19 and the steering-ropes 5 are inserted in accordance with the rinsing depth.

A mast 102 is arranged on the two ships 1 which are rigidly interconnected with each other by means of a lashing connection 2 (please see FIGS. 1–3) which mast may also be designed in the manner of a portal mast. This mast serves on the one hand in a manner known per se to support the loading equipment at the derrick of which the rope 64 for suspending the rinsing apparatus 3 is engaging. This rope 64 is guided over the rope drum 96 of the motor driven winch 22. At a wrapping drum 97 of this winch 22 the towing rope 19 is engaging. The level and angular position of the derrick of said loading equipment are fixed in a manner known per se which is not described nor shown.

The mast 102 serves in addition to support another derrick 98 from which the roller type carriers 30 are suspended for the support deviation and introducing of the pipes or cables 9 to be laid. The rope 99 from which these roller type carriers are suspended is actuated by means of a winch 100 which is designed in the manner of a hand winch because this rope is but rarely lifted and lowered. Of course, it is possible as well to provide two masts for the two derricks which are independent of each other.

What I claim is:

1. A submarine trenching system for laying continuous flexible pipes or cables comprising, in combination, a substantially vertically disposed enclosed longitudinal carrier having a front, a rear, a lower flush-jet portion adapted to be introduced into the bed of the water body to be trenched and a longitudinally extending forward edge, at least one first longitudinally extending channel defined behind said forward edge in said carrier, water connection means for feeding pressurized water into said first channel, a plurality of discharge nozzles communicating with said first channel and arranged in said lower portion of said carrier adjacent said forward edge for ejecting pressurized water supplied through said first channel, at least one second longitudinally extending channel defined behind said forward edge and said first channel in said carrier, entrance means for feeding at least one flexible pipe or cable to be laid into said second channel, an opening defined at the rear of said lower end portion of said carrier in communication with said second channel for issuing said flexible pipe or cable therefrom, means for introducing said flexible pipe or cable into said entrance means of said carrier, a floating unit disposed forward of said carrier, abutment means defined on said floating unit abutting said carrier forward edge, a flexible carrier suspension tension member having one end affixed to said carrier and its other end connected to said floating unit at an elevation above said carrier suspending said carrier from said floating unit, carrier suspension take-up mechanism mounted on said floating unit and associated with said carrier suspension tension member to raise and lower said carrier with respect to said floating unit, a flexible towing tension member affixed at one end to said carrier forward edge at said lower portion and supported at a stationary point remote from said floating unit in the laying direction, towing takeup mechanism connected with the other end of said towing tension member to move said carrier and said floating unit abutting said carrier in the direction of the laying operation, two flexible steering tension members each having one end affixed to said carrier lower portion forward edge and extending obliquely to said towing tension member, a steering tension member being disposed on each horizontal side of said towing tension member, and a steering take-up mechanism mounted on said floating unit on each horizontal side of said towing tension member forward of said abutment means and connected with the other end of a steering flexible tension member for varying the lengths of said steering tension members to thereby steer the carrier, whereby said carrier may be steered transversely to the laying direction by shortening one of said steering tension members and simultaneously equally lengthening the other one of said steering tension members, and whereby said carrier may be tilted with respect to said floating unit about said abutment means by simultaneously equally varying the lengths of said steering tension members.

2. In a submarine trenching system as in claim 1 wherein said towing take-up mechanism for varying the length of said towing tension member is mounted on said floating unit, and a reversing roller rotatably supported remote from said floating unit constituting the stationary point of support of said towing tension member, said towing tension member passing around said reversing roller to said towing take-up mechanism.

3. In a submarine trenching system as in claim 1, a vibration device for generating mechanical vibrations in a direction substantially longitudinal of said carrier mounted on said carrier, and a vibration absorbing assembly interposed between said carrier and said carrier suspension tension member.

4. In a submarine trenching system as in claim 1, a third longitudinally extending channel defined in said carrier, said carrier including a bottom, said third channel terminating in an opening defined in said bottom of said carrier, a plurality of auxiliary nozzles within said carrier lower end portion discharging a pressurized fluid into the interior of said third channel in a direction away from said carrier lower end portion and third channel opening to create suction in said opening and said lower end portion, a rearward drain defined in said carrier in communication with said third channel adapted to conduct material drawn by said suction into said third channel onto the laid pipe or cable.

5. A submarine trenching system for laying continuous flexible pipes or cables comprising, in combination, a substantially vertically disposed enclosed longitudinal carrier having a front, a rear, a lower flush-jet portion adapted to be introduced into the bed of the water body to be trenched and a longitudinally extending forward edge, at least one first longitudinally extending channel defined behind said forward edge in said carrier, water connection means for feeding pressurized water into said first channel, a plurality of discharge nozzles communicating with said first channel and arranged in said lower portion of said carrier adjacent said forward edge for ejecting pressurized water supplied through said first channel, at least one second longitudinally extending channel defined behind said forward edge and said first channel in said carrier, entrance means for feeding at least one flexible pipe or cable to be laid into said second channel, an opening defined at the rear of said lower end portion of said carrier in communication with said second channel for issuing said flexible pipe or cable therefrom, means for introducing said flexible pipe or cable into said entrance means of said carrier, a floating unit disposed forward of said carrier, abutment means defined on said floating unit abutting said carrier forward edge, a flexible carrier suspension tension member having one end affixed to said carrier and its other end connected to said floating unit at an elevation above said carrier suspending said carrier from said floating unit, carrier suspension take-up mechanism mounted on said floating unit and associated with said carrier suspension tension member to raise and lower said carrier with respect to said floating unit, a flexible towing tension member affixed at one end to said carrier forward edge at said lower portion and supported at a stationary point remote from said floating unit in the laying direction, towing take-up mechanism connected with the other end of said townig tension member to move said carrier and said floating unit abutting said carrier in the direction of the laying operation, two flexible steering tension members each having one end affixed to said carrier lower portion forward edge and extending obliquely to said towing tension member, a steering tension member being disposed on each horizontal side of said towing tension member, a steering take-up mechanism mounted on said floating unit on each horizontal side of said towing tension member forward of said abutment means and connected with the other end of a steering flexible tension member for varying the lengths of said steering tension members to thereby steer the carrier, whereby said carrier may be steered transversely to the laying direction by shortening one of said steering tension members and simultaneously equally lengthening the other one of said steering tension members, and whereby said carrier may be tilted with respect to said floating unit about said abutment means by simultaneously equally varying the lengths of said steering tension members, and a pull-down flexible tension member having one end affixed to an upper portion of said carrier and the other end attached to a pull-down take-up mechanism mounted on said floating unit at a location vertically below said carrier upper portion for varying the length of said pull-down tension member to thereby permit biasing said carrier downwardly by reducing the length of said pull-down tension member and imposing a part of the weight of said floating unit upon said carrier.

6. In a submarine trenching system as in claim 5, a vibration device for generating mechanical vibrations in a direction substantially longitudinal of said carrier mounted on said carrier, and a vibration absorbing assembly interposed between said carrier and said carrier suspension tension member.

7. In a submarine trenching system as in claim 5, a third longitudinally extending channel defined in said carrier, said carrier including a bottom, said third channel terminating in an opening defined in said bottom of said carrier, a plurality of auxiliary nozzles within said carrier lower end portion discharging a pressurized fluid into the interior of said third channel in a direction away from said carrier lower end portion and third channel opening to create suction in said opening and said lower end portion, a rearward drain defined in said carrier in communication with said third channel adapted to conduct material drawn by said suction into said third channel onto the laid pipe or cable.

References Cited by the Examiner

UNITED STATES PATENTS

| | | | |
|---|---|---|---|
| 734,615 | 7/1903 | Roberts | 61—72.4 |
| 1,152,326 | 8/1915 | Lewis | 61—72.4 |
| 3,103,790 | 9/1963 | Popich | 61—72.4 |
| 3,111,007 | 11/1963 | Ryan | 61—72.1 |

FOREIGN PATENTS

| | | |
|---|---|---|
| 555,954 | 8/1932 | Germany. |
| 629,544 | 5/1936 | Germany. |
| 698,495 | 10/1940 | Germany. |
| 705,470 | 4/1941 | Germany. |
| 727,746 | 11/1942 | Germany. |
| 900,959 | 1/1954 | Germany. |
| 1,111,692 | 7/1961 | Germany. |
| 149,003 | 10/1921 | Great Britain. |
| 510,064 | 7/1939 | Great Britain. |
| 562,574 | 7/1944 | Great Britain. |

OTHER REFERENCES

Engineering News Record Magazine September 10, 1953; pages 43–47.

CHARLES E. O'CONNELL, *Primary Examiner.*

EARL J. WITMER, *Examiner.*